United States Patent
Hong et al.

(10) Patent No.: US 10,880,222 B2
(45) Date of Patent: Dec. 29, 2020

(54) METHOD AND APPARATUS FOR TRANSMITTING A RLC LAYER STATUS REPORT

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 137 days.

(21) Appl. No.: 15/963,422

(22) Filed: Apr. 26, 2018

(65) Prior Publication Data
US 2018/0316619 A1    Nov. 1, 2018

(30) Foreign Application Priority Data

Apr. 28, 2017   (KR) .................. 10-2017-0054976
Mar. 22, 2018   (KR) .................. 10-2018-0033007

(51) Int. Cl.
| | |
|---|---|
| H04L 12/801 | (2013.01) |
| H04L 1/16 | (2006.01) |
| H04L 29/06 | (2006.01) |
| H04L 29/08 | (2006.01) |
| H04W 24/02 | (2009.01) |

(52) U.S. Cl.
CPC ............ *H04L 47/34* (2013.01); *H04L 1/1621* (2013.01); *H04L 1/1628* (2013.01); *H04L 69/22* (2013.01); *H04L 69/321* (2013.01); *H04L 69/324* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 7,525,908 | B2 * | 4/2009 | Olsson | H04L 1/0083 370/229 |
| 7,885,263 | B2 * | 2/2011 | Sun | H04L 1/0079 370/392 |
| 8,050,228 | B2 * | 11/2011 | Umesh | H04L 1/187 370/330 |

(Continued)

FOREIGN PATENT DOCUMENTS

| | | |
|---|---|---|
| KR | 10-1376583 B1 | 3/2014 |
| KR | 10-1693772 B1 | 1/2017 |
| KR | 10-2017-0020441 A | 2/2017 |

OTHER PUBLICATIONS

KT Corporation, "KT PyeongChang 5G Special Interest Group (KT 5G-SIG); KT 5th Generation Radio Access; Overall Description; (Release 1)", TS 5G.300 v1.1 (Jun. 2016), pp. 1-29.

(Continued)

*Primary Examiner* — Parth Patel
*Assistant Examiner* — Berhanu D Belete
(74) *Attorney, Agent, or Firm* — IP Legal Services, LLC

(57) ABSTRACT

A method of a terminal may be provided for transmitting an RLC status protocol data unit (PDU). The method may include receiving an RLC data unit from a base station, configuring the RLC status PDU indicating whether the RLC data unit is received, where the RLC status PDU includes at least one of a negative acknowledgement (NACK) sequence number field and a NACK range field; and transmitting the RLC status PDU to the base station.

6 Claims, 9 Drawing Sheets

(56) References Cited

U.S. PATENT DOCUMENTS

| | | | | |
|---|---|---|---|---|
| 8,533,553 | B2* | 9/2013 | Yang | H04L 1/1607 714/748 |
| 8,660,068 | B2* | 2/2014 | Chun | H04L 1/1628 370/328 |
| 9,185,045 | B1* | 11/2015 | Yang | H04L 47/34 |
| 2006/0067238 | A1* | 3/2006 | Olsson | H04L 1/1685 370/242 |
| 2007/0133605 | A1* | 6/2007 | Herrmann | H04L 1/1812 370/473 |
| 2008/0084883 | A1* | 4/2008 | Sun | H04L 69/324 370/392 |
| 2009/0203374 | A1* | 8/2009 | Chun | H04L 1/1628 455/425 |
| 2009/0215456 | A1* | 8/2009 | Chun | H04W 72/1257 455/435.1 |
| 2009/0327830 | A1* | 12/2009 | Lee | H04L 1/1887 714/749 |
| 2011/0283157 | A1* | 11/2011 | Yang | H04L 1/1607 714/749 |
| 2012/0307785 | A1* | 12/2012 | Chun | H04L 1/1628 370/329 |
| 2013/0272203 | A1* | 10/2013 | Chun | H04W 28/04 370/328 |
| 2014/0192822 | A1* | 7/2014 | Chun | H04L 1/0084 370/470 |
| 2014/0362832 | A1* | 12/2014 | Rudolf | H04L 1/1822 370/336 |
| 2016/0142184 | A1* | 5/2016 | Yi | H04L 1/1896 714/748 |
| 2016/0323062 | A1* | 11/2016 | Yang | H04L 47/34 |
| 2017/0099128 | A1 | 4/2017 | Gao et al. | |
| 2017/0331595 | A1* | 11/2017 | Rudolf | H04L 5/0007 |
| 2018/0287748 | A1* | 10/2018 | Kim | H04L 49/9015 |
| 2019/0357202 | A1* | 11/2019 | Tang | H04L 47/34 |

OTHER PUBLICATIONS

Ericsson, "RLC Status report format", Tdoc R2-1702740, 3GPP TSG-RAN WG2 #97bis, Spokane, USA, Apr. 3-7, 2017, pp. 1-3.

Intel Corporation, "RLC status report in NR", R2-1703437, 3GPP TSG-RAN WG2 Meeting #97bis, Spokane, USA, Apr. 3-7, 2017, pp. 1-2.

Samsung, "ARQ and RLC status PDU for NR", R2-1703733, 3GPP TSG-RAN WG2 Meeting #97bis, Spokane, USA, Apr. 3-7, 2017, pp. 1-3.

* cited by examiner

FIG.2

| | | | |
|---|---|---|---|
| D/C | CPT | ACK_SN | Oct 1 |
| ACK_SN | | | Oct 2 |
| ACK_SN | E1 | NACK_SN | Oct 3 |
| NACK_SN | | | Oct 4 |
| NACK_SN | E1 | E2 | Oct 5 |
| NACK_SN | | | Oct 6 |
| NACK_SN | | E1 | Oct 7 |
| E2 | SOstart | | Oct 8 |
| SOstart | | | Oct 9 |
| | SOend | | Oct 10 |
| SOend | | | Oct 11 |
| | NACK_SN | | Oct 12 |
| ... | | | |

FIG.5

| | E3 FIELD interpretation |
|---|---|
| Value | CONTENT |
| 0 | NACK range field does not follow this NACK_SN |
| 1 | NACK range field follow this NACK_SN |

FIG.6

| D/C | CPT | | A_S | | |
|---|---|---|---|---|---|
| A_S | | | | | |
| A_S | | | | E1 | E2 |
| E3 | N_S | | | | |
| N_S | | | | | |
| N_S | E1 | E2 | E3 | Ss | |
| Ss | | | | | |
| Ss | | | Se | | |
| Se | | | | | |
| Se | | | Ss | | |
| Ss | | | | | |
| Ss | | | | | |
| Ss | | | Se | | |
| Se | | | | | |
| Se | | | N_R | | |
| N_S | | | N_S | | |
| N_S | | | | | |
| N_S | | | | | ... |
| ... | | | | | |

FIG.7

| D/C | CPT | | A_S | |
|---|---|---|---|---|
| A_S | | | | |
| A_S | | | E1 | N_S |
| N_S | | | | |
| N_S | | | | |
| N_S | E1 | E2 | E3 | N_S |
| N_S | | | | |
| N_S | | | E1 | E2 |
| E3 | Ss | | | |
| Ss | | | | |
| Ss | Se | | | |
| Se | | | | |
| Se | N_S | | | |
| N_S | | | | |
| N_S | E1 | E2 | E3 | Ss |
| Ss | | | | |
| Ss | | | Se | |
| Se | | | | |
| Se | | | N_R | |
| N_R | | | N_S | |
| N_S | | | | |
| N_S | | | | |
| ... | | | | |

METHOD AND APPARATUS FOR TRANSMITTING A RLC LAYER STATUS REPORT

CROSS REFERENCE TO RELATED APPLICATION

This application claims priority from Korean Patent Application Nos. 10-2017-0054976 & 10-2018-0033007, filed on Apr. 28, 2017 & Mar. 22, 2018, which are hereby incorporated by reference for all purposes as if fully set forth herein.

BACKGROUND OF THE INVENTION

1. Field of the Invention

The present disclosure relates to efficiently generating, transmitting and receiving a radio link control (RLC) status report in a next generation wireless access network, and more particularly, to reducing a load for RLC status reporting according to changes in RLC entity functions in a next generation wireless access network.

2. Description of the Related Art

Along with the evolution of communication systems, various types of wireless terminals have been introduced to consumers such as companies and individuals.

Mobile communication systems based on the 3rd generation partnership project (3GPP), such as Long Term Evolution (LTE), LTE-Advanced, and 5G, have been required to transmit and receive a large amount of various data, such as video data and a radio data at a high-speed as fast as a typical system for providing voice-oriented services.

To this end, a next generation wireless access network technology, subsequent to LTE-Advanced, has been developed for accommodating transmission and reception of data to and from more terminals and providing a higher Quality of Service (QoS). For example, a 5G network has been developed by worldwide organizations such as 3GPP.

In particular, there is a need for a method of securing higher speed and data reliability in order to reliably provide a service such as ultra-reliable and low-latency communications (URLLC) with low latency.

For the 5G network, however, a data unit connection function is performed in a MAC layer to support fast processing of a terminal. Thus, when a status reporting procedure is performed in an RLC layer, it might need transmitting and receiving information on a plurality of RLC data units.

This increases overhead of RLC status reporting and cannot satisfy requirements for low-latency and high-reliability data transmission and reception based on fast processing of the terminal.

SUMMARY OF THE INVENTION

The present disclosure is directed to a method and apparatus for reporting status information of a radio link control (RLC) layer in order to minimize system overload and provide a highly reliable data transmission/reception function even in a network employing a new wireless access technology.

The present disclosure is directed to a detailed method and apparatus for effectively detecting and checking loss of an RLC data unit in a network structure without performing a data unit connection function in the RLC layer but performing in a MAC layer.

According to an aspect of the present disclosure, there is provided a method of a terminal for transmitting an RLC status protocol data unit (PDU), the method including receiving the RLC data unit from a base station; configuring the RLC status PDU indicating whether the RLC data unit is received, where the RLC data unit includes at least one of a negative acknowledgement (NACK) sequence number field and a NACK range field; and transmitting the RLC status PDU to the base station.

According to another aspect of the present disclosure, there is provided a method of the base station receiving the RLC status PDU, the method including transmitting the RLC data unit to the terminal; receiving the RLC status PDU indicating whether the terminal has received the RLC data unit, which includes at least one of the NACK sequence number field and the NACK range field; and checking whether the terminal has properly received the RLC data unit by using the RLC status PDU.

According to still another aspect of the present disclosure, there is provided the terminal that transmits the RLC status PDU, the terminal including a reception unit configured to receive the RLC data unit from the base station; a control unit configured to configure the RLC status PDU indicating whether the RLC data unit, which includes at least one of the NACK sequence number field and the NACK range field, is received; and a transmission unit configured to transmit the RLC status PDU to the base station.

According to an aspect of the present disclosure, there is provided the base station that receives the RLC status PDU, the base station including a transmission unit configured to transmit the RLC data unit to the terminal; a reception unit configured to receive the RLC status PDU indicating whether the terminal has received the RLC data unit, which includes at least one of the NACK sequence number field and the NACK range field; and a control unit configured to check whether the terminal has properly received the RLC data unit by using the RLC status PDU.

BRIEF DESCRIPTION OF THE DRAWINGS

The above and other aspects, features and advantages of the present disclosure will be more apparent from the following detailed description taken in conjunction with the accompanying drawings, in which:

FIG. 2 is a diagram showing a field configuration of a radio link control (RLC) status PDU;

FIG. 5 is a diagram illustrating a value of an indication field according to an embodiment;

FIG. 6 is a diagram showing the RLC status PDU format according to an embodiment;

FIG. 7 is a diagram showing the RLC status PDU format according to another embodiment;

DETAILED DESCRIPTION OF THE EXEMPLARY EMBODIMENTS

Figure 1:
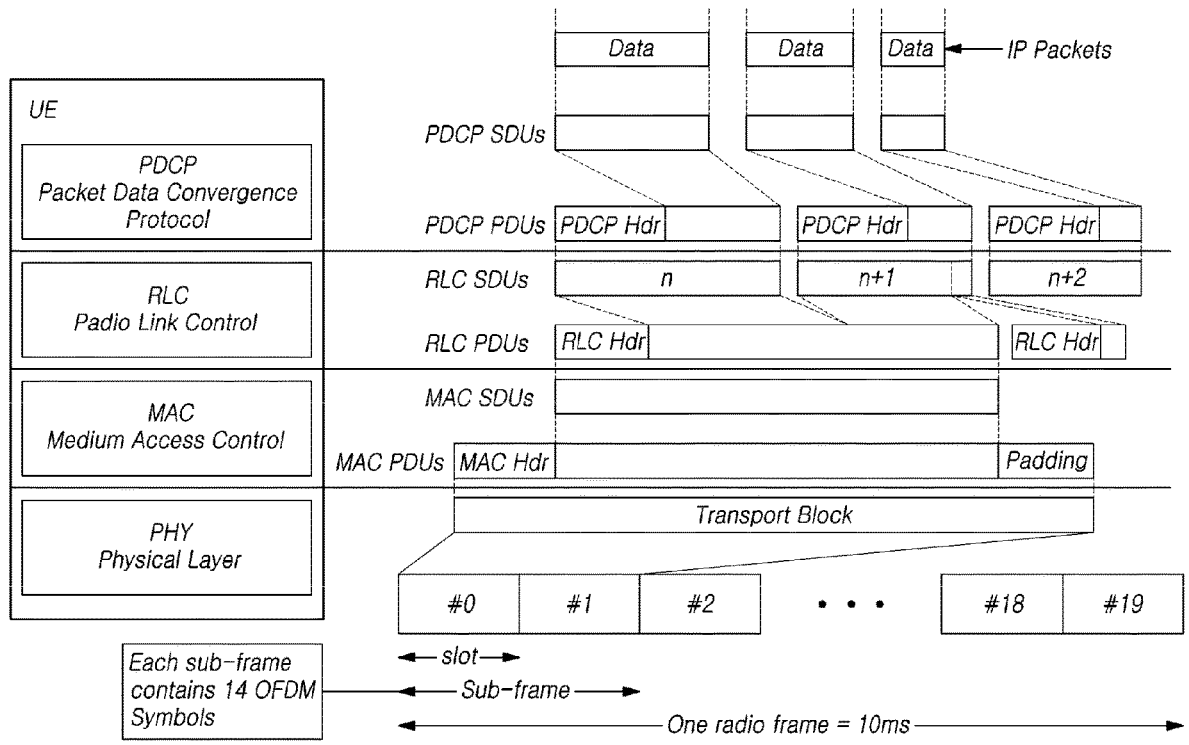
FIG. 1 is a diagram illustrating configuring a protocol data unit (PDU) and a service data unit (SDU) in each layer during a typical procedure of a terminal for transmitting data.

Hereinafter, embodiments will be described in detail with reference to the accompanying drawings. In adding reference numerals to elements in each drawing, it should be noted that the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In the present specification, a machine type communication (MTC) terminal refers to a terminal that supports low cost or low complexity, a terminal that supports coverage enhancement, or the like. In the present specification, the MTC terminal refers to a terminal that supports low costs or low complexity, a terminal that supports coverage enhancement, or the like. Alternatively, in the present specification, the MTC terminal refers to a terminal that is defined as a predetermined category for supporting low costs (or low complexity) and/or coverage enhancement.

In other words, in the present specification, the MTC terminal may refer to a newly defined third generation partnership project (3GPP) Release 13 low cost (or low complexity) UE category/type, which executes LTE-based MTC related operations. Alternatively, in the present specification, the MTC terminal may refer to a UE category/type that is defined in or before 3GPP Release-12 that supports the enhanced coverage or relatively low power consumption in comparison with the existing LTE coverage or may refer to a newly defined Release 13 low cost (or low complexity) UE category/type.

A wireless communication system according to an embodiment may be widely installed to provide various communication services, such as a voice date, packet data, and the like. The wireless communication system may include a user equipment (UE) and a base station (BS) or an evolved node B (eNB). Throughout the specification, a user terminal may be an inclusive concept indicating the terminal utilized in wireless communication, including a UE in wideband code division multiple access (WCDMA), long term evolution (LTE), high speed packet access (HSPA), and the like, and a mobile station (MS), the user terminal (UT), a subscriber station (SS), a wireless device, and the like in global systems for mobile communication (GSM).

The base station or a cell may generally refer to a station that communicates with the user terminal, and may be interchangeably used with the terms "Node-B," "evolved Node-B (eNB)," "sector," "site," "base transceiver system (BTS)," "access point (AP)," "relay node," "remote radio head (RRH)," "radio unit (RU)," "small cell," and the like.

That is, in the present specification, the base station or the cell may be construed as an inclusive concept indicating some areas or functions covered by the base station controller (BSC) in code division multiple access (CDMA), the NodeB in wideband code division multiple access (WCDMA), the eNB or the sector (site) in LTE, and the like, and the concept may include any of various coverage areas such as a megacell, a macrocell, a microcell, a picocell, a femtocell, communication ranges of the relay node, the RRH, the RU, and the small cell.

Each of the above mentioned various cells has the base station that controls a corresponding cell. Thus, the base station may be construed in the following two ways: (1) the base station may be a device itself that provides the mega cell, the macro cell, the micro cell, the picocell, the femto-cell, and the small cell in association with a wireless area; and (2) the base station may indicate the wireless area itself. In (1), the base station may be referred to any devices that interact with one another for providing a predetermined wireless area to be controlled by one device or to be controlled by cooperation with one another. Based on a configuration type of the wireless area, the eNB, the RRH, an antenna, the RU, a low power node (LPN), a point, a transmission/reception point, a transmission point, a reception point, and the like may be examples of the base station. In (2), the wireless area itself where signals are received or transmitted from the perspective of the user terminal or a neighboring base station may be referred to as the base station.

Therefore, the megacell, the macrocell, the microcell, the picocell, the femtocell, the small cell, the RRH, the antenna, the RU, the LPN, the point, the eNB, the transmission/reception point, the transmission point, and the reception point are collectively referred to as the base station.

In the specification, the user terminal and the base station are used as two inclusive transceiving subjects to embody the technology and technical concepts described in the specification and may not be limited to predetermined terms or words. In the specification, the user terminal and the base station are used as two (uplink or downlink) inclusive transceiving subjects to embody the technology and technical concepts described in the specification and may not be limited to predetermined terms or words. Here, uplink (UL) refers to a scheme in which the user terminal transmits and receives data to and from the base station, and downlink (DL) refers to a scheme in which the base station transmits and receives data to and from the user terminal.

There are no restrictions on multiple access schemes applied to wireless communication systems. Multiple access schemes such as code division multiple access (CDMA), time division multiple access (TDMA), frequency division multiple access (FDMA), orthogonal frequency division multiple access (OFDMA), OFDM-FDMA, OFDM-TDMA, OFDM-CDMA, and the like may be used. An embodiment of the present invention may be applicable to resource allocation in an asynchronous wireless communication scheme that evolves to LTE and LTE-advanced via global system for mobile communication (GSM), WCDMA, and high speed packet access (HSPA) and in a synchronous wireless communication scheme that evolves to CDMA, CDMA-2000, and UMB. The present invention should not be construed as being restricted or limited to a specific wireless communication field and should be construed as including all technical fields to which the technical spirit of the present invention is applicable.

UL transmission and DL transmission may be performed using one of i) a time division duplex (TDD) scheme that performs the transmission by using different times, and ii) a frequency division duplex (FDD) scheme that performs the transmission by using different frequencies.

Further, in a system such as LTE and LTE-A, a related standard specification defines a UL and a DL to be configured based on a single carrier or a pair of carriers. The UL and the DL may carry control information through a control channel such as Physical DL Control CHannel (PDCCH), Physical Control Format Indicator CHannel (PCFICH), Physical Hybrid ARQ Indicator CHannel (PHICH), Physical UL Control CHannel (PUCCH), Enhanced Physical DL Control CHannel (EPDCCH), and the like and may carry data through a data channel such as Physical DL Shared CHannel (PDSCH), Physical UL Shared CHannel (PUSCH), and the like.

Meanwhile, the UL and the DL may carry control information even by using enhanced PDCCH or extended PDCCH (EPDCCH).

In the present disclosure, the cell may refer to i) a coverage area of a signal transmitted from a transmission/reception point (or a transmission point), ii) a component carrier having a coverage area of the signal transmitted from the transmission/reception point, or iii) the transmission/reception point itself.

A wireless communication system according to embodiments refers to a coordinated multi-point transmission/reception (CoMP) system where two or more transmission/reception points cooperatively transmit a signal, a coordinated multi-antenna transmission system, or a coordinated multi-cell communication system. The CoMP system may include at least two multi-transmission/reception points and terminals A multi-transmission/reception point may be i) a base station or ii) a macrocell (hereinafter, referred to as an eNB) and at least one RRH that has high transmission power or low transmission power within a macrocell area and that is connected to an eNB through an optical cable or an optical fiber and wiredly controlled.

Hereinafter, a DL refers to communication or a communication path from a multi-transmission/reception point to the terminal, and a UL refers to communication or a communication path from the terminal to a multi-transmission/reception point. In the DL, a transmitter may be a part of the multi-transmission/reception point, and a receiver may be a part of the terminal. In the UL, a transmitter may be a part of the terminal, and a receiver may be a part of the multi-transmission/reception point.

Hereinafter, the situation in which the signal is transmitted and received through a channel such as PUCCH, PUSCH, PDCCH, EPDCCH, and PDSCH may be described through the expression "PUCCH, PUSCH, PDCCH, EPDCCH, and PDSCH are transmitted or received."

In addition, hereinafter, the expression "PDCCH is transmitted or received," or "the signal is transmitted or received through PDCCH" includes "EPDCCH is transmitted or received," or "the signal is transmitted or received through EPDCCH."

That is, a physical DL control channel used herein may indicate PDCCH or EPDCCH and may indicate both of the PDCCH and the EPDCCH.

Also, for convenience of description, according to an embodiment of the present disclosure, EPDCCH may be applied to a part described using PDCCH, and PDCCH may be applied to a part described using EPDCCH.

Meanwhile, higher layer signaling, which will be described below, includes RRC signaling that carries RRC information including RRC parameters.

An eNB performs DL transmission to terminals. The eNB may transmit Physical DL Shared Channel (PDSCH), which is a primary physical channel for unicast transmission, and the eNB may transmit Physical DL Control Channel (PDCCH) for carrying DL control information such as scheduling required for reception of the PDSCH and scheduling approval information for transmission of a UL data channel (e.g., Physical UL Shared Channel (PUSCH)). Hereinafter, transmission and reception of the signal through each channel may be described as transmission and reception of a corresponding channel.

As a representative usage scenario in new radio (NR), which is recently discussed in the 3GPP, enhanced Mobile BroadBand (eMBB), massive MTC (mMTC), and Ultra Reliable and Low Latency Communication (URLLC) have been proposed.

In this disclosure, a frequency, a frame, a sub-frame, resources, resource blocks, a region, a band, a sub-band, the control channel, the data channel, a synchronization signal, various kinds of reference signals, various kinds of signals, and various kinds of messages which are associated with the NR may be interpreted in various meanings in the past, at present, or in the future.

For example, in the present disclosure, the LTE and the NR refer to different wireless access technologies, and a new wireless access technology, which is being discussed in 3GPP Release 15, is described as the NR. The NR may have various differences from the LTE in terms of a frame structure, the channel, and a core network technology, and the like. Various functions for wireless transmission, high-speed transmission, and large-scale data transmission in high bands may be added to the NR.

Hereinafter, for convenience of description, the typical wireless access technology will be described as the LTE, and a new wireless access technology being discussed in the 3GPP will be described as the NR. Also, the base station may be an eNB using the LTE technology and also may be a gNB using the NR technology, which will be separately described as necessary.

Also, the term "cell" is comprehensively used to cover a wireless path, a wireless link, a carrier, and the like for carrying data. One base station may transmit and receive data through a plurality of cells. Alternatively, the terminal may transmit and receive data using a plurality of cells by means of cells controlled by two base stations.

FIG. 1 is a diagram illustrating an operation of configuring a PDU and a service data unit (SDU) in each layer during a typical procedure of a terminal for transmitting data.

Referring to FIG. 1, in the LTE wireless access technology, a data unit for each layer is configured and transmitted through PDCP, RLC, and MAC layers of the terminal, and a transport block is configured and transmitted through a physical layer.

For example, in the LTE, the RLC layer performs framing of RLC SDUs to put the RLC SDUs into a size indicated by a lower MAC layer. The LTE RLC transmitter segments and/or concatenates RLC SDUs to construct RLC PDUs, and the LTE RLC receiver reassembles RLC PDUs to reconstruct RLC SDUs. In the LTE RLC, an independent RLC entity is set for each radio bearer. To support various QoS, three modes are provided: Transparent Mode (TM), Unacknowledged Mode (UM), and Acknowledged Mode (AM).

The above-described three RLC modes have different operating methods and also different sub-functions because the modes support different QoS.

The TM RLC is a mode in which no overhead is attached to the RLC SDU transferred from an upper layer when RLC PDU is configured. That is, the SDU is transparently passing through the TM RLC. Thus, the SDU is utilized only for the transport of special RRC messages that do not require security protection. For example, for the UL, the TM RLC is responsible for transmission of RRC messages (SRB0 through the CCCH) received from an unspecified terminal. For the DL, the TM RLC is responsible for transmission of RRC messages (e.g., a paging message through the PCCH, system information through the BCCH, and the like) broadcasted to all terminals in a cell. In the TM RLC, the messages bypass the PDCP layer because security protection is not required. Therefore, the upper layer of the TM RLC is the RRC layer.

Unlike the TM, a non-transparent mode is a mode causing overhead to the RLC. The non-transparent mode includes i) the UM providing no acknowledgement in response to reception of data and ii) the AM providing an acknowledgement in response to reception of data.

The UM RLC is a mode that is optimized for delay-sensitive user traffic such as voice (e.g., VoIP) or streaming. The UM RLC is used only for user plane data. To support the delay-sensitive characteristics, retransmission is not performed in the UM RLC. Thus, there is no need to provide feedback from the receiver.

The AM RLC, which is one non-transparent mode, configures the PDU by attaching a PDU header including a sequence number (SN) to the PDU, like the UM RLC. However, unlike the UM RLC, the AM RLC has a large difference in that a reception side provides an acknowledgement of the PDU transmitted by a transmission side. The reason the reception side provides an acknowledgement in the AM RLC is that the reception side requires the transmission side to retransmit the PDU that has not been received. The key feature of the AM RLC is "retransmission."

As a result, the AM RLC guarantees error-free data transmission with the aid of retransmission. Thus, in the user plane, the AM RLC is responsible for transmission of non-real-time packet data such as TCP/IP of a packet service area, and in the control plane, the AM RLC is responsible for transmission of an RRC message that necessarily requires an acknowledgement among RRC messages to be transmitted to a specific terminal in a cell.

Meanwhile, the RLC layer is used even in the NR, which is called a 5G wireless access network. Like the LTE, the NR RLC also supports AM, UM, and TM modes. Accordingly, there is a need to support a status report for supporting the AM mode even in the NR RLC layer.

In the specification, information used by the AM RLC entity to instruct a transmission end to determine whether the RLC data unit is lost is referred to as RLC status information, an RLC status report, the RLC status PDU, and the like, which are merely names. Therefore, the present invention is not limited thereto.

In the RLC status reporting in the typical LTE, non-acknowledgement (NACK) SNs are individually indicated. In the LTE, only one RLC PDU is included in one transport block for any logical channel. In a case in which one transport block is not accurately received, only one RLC PDU is lost. Since the LTE RLC supports a concatenation function, one RLC PDU may concatenate a plurality of RLC SDUs. The LTE MAC may multiplex RLC PDUs from different logical channels, and thus the MAC PDU does not contain many RLC PDUs. Accordingly, in the LTE, the individual transmission of NACK SNs is not overhead in the RLC status report.

However, in the NR, the concatenation function is removed from the RLC layer and performed by the MAC layer in order to support fast terminal processing. Thus, an RLC PDU containing a relatively large number of RLC SNs may be processed compared to the LTE. Also, when the MAC PDU is lost during a transmission process, a large number of RLC PDUs is lost. Accordingly, there is a need for a method for effectively generating the RLC status report according to a change in an NR protocol structure.

In order to solve the aforementioned problem, the present disclosure proposes a configuration of the RLC status report that is available in the NR protocol structure and a detailed method of transferring information regarding an RLC loss data unit by using the configuration of the RLC status report.

FIG. 2 is a diagram showing a field configuration of a RLC status PDU.

Fields included in the RLC status PDU will be described in detail with reference to FIG. 2.

Acknowledgement SN (ACK_SN) field (hereinafter referred to as "ACK_SN" or "A_S"): the SN of the following unreceived RLC data PDU which is not reported as missing in the status PDU (The ACK_SN field indicates the SN of the unreceived RLC Data PDU which is not reported as missing in the STATUS PDU. When the transmitting side of the AM RLC entity receives a STATUS PDU, it interprets that all acknowledged mode data (AMD) PDUs up to but not including the AMD PDU with SN=ACK_SN have been received by its peer AM RLC entity, excluding those AMD PDUs indicated in the STATUS PDU with NACK_SN and portions of AMD PDUs indicated in the STATUS PDU with NACK_SN, segment offset start (SOstart) and segment offset end (SOend)).

NACK_SN field (hereinafter referred to as "NACK_SN" or "N_S"): the SN of the AMD PDU (or portions thereof) that has been detected as lost at the receiver (The NACK_SN field indicates the SN of the AMD PDU (or portions of it) that has been detected as lost at the receiving side of the AM RLC entity).

E1 field: a 1-bit indicator indicating whether NACK_SN+ E1+E2 follows (The E1 field indicates whether or not a set of NACK_SN, E1 and E2 follows).

E2 field: a 1-bit indicator indicating whether information SOstart+SOend follows NACK_SN (The E2 field indicates whether or not a set of SOstart and SOend follows).

SOstart field (hereinafter referred to as "SOstart" or "Ss"): a field indicating the position of the first byte of a portion of the AMD PDU (corresponding to the NACK_SN) in byte within the data field of the AMD PDU when the portion is lost (The SOstart field (together with the SOend field) indicates the portion of the AMD PDU with SN=NACK_SN (the NACK_SN for which the SOstart is related to) that has been detected as lost at the receiving side of the AM RLC entity. Specifically, the SOstart field indicates the position of the first byte of the portion of the AMD PDU in bytes within the data field of the AMD PDU).

SOend field (hereinafter referred to as "SOend" or "Se"): a field indicating the position of the last byte of a portion of the AMD PDU (corresponding to NACK_SN) in bytes within the data field of the AMD PDU when the portion is lost (The SOend field (together with the SOstart field) indicates the portion of the AMD PDU with SN=NACK_SN (the NACK_SN for which the SOend is related to) that has been detected as lost at the receiving side of the AM RLC entity. Specifically, the SOend field indicates the position of the last byte of the portion of the AMD PDU in bytes within the data field of the AMD PDU).

As described, in the LTE, the status PDU payload starts from the first bit following the RLC control PDU header as shown in FIG. 2. Also, the status PDU payload consists of one ACK_SN and one E1, zero or more sets of the NACK_SN, the E1 and the E2, and the SOstart and the SOend for each NACK_SN. (The STATUS PDU payload starts from the first bit following the RLC control PDU header, and consists of one ACK_SN and one E1, zero or more sets of the NACK_SN, the E1 and the E2, and possibly a set of the SOstart and the SOend for each NACK_SN).

As described, when in the typical LTE, the configuration of the RLC status PDU is applied to the NR, and a plurality of RLC SDUs are lost in the NR, the number of field included in the status PDU rapidly increases, and thus the entire load of the system may increase.

Accordingly, the configuration and transmission/reception of the RLC status PDU applicable to the NR by solving the above problem will be described below.

Figure 3:
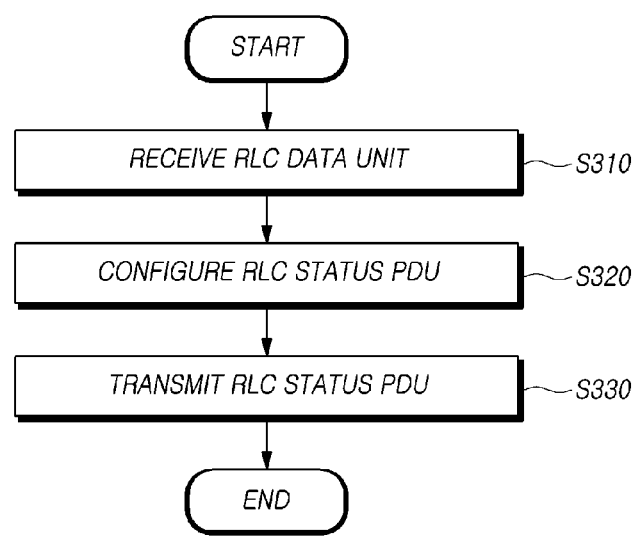
FIG. 3 is a flowchart illustrating operations of a terminal according to an embodiment.

FIG. 3 is a flowchart illustrating operations of a terminal according to an embodiment.

Referring to FIG. 3, the terminal that transmits a radio link control (RLC) status protocol data unit (PDU) may receive an RLC data unit from the base station (S310). For example, the terminal may receive DL data from the base station. The DL data may be received through a physical layer, and a plurality of RLC data units may be segmented and concatenated in the MAC layer and then configured and received as one transport block. That is, the terminal may receive the transmitted DL RLC data unit from the base station.

Subsequently, the terminal checks whether the RLC data unit is lost. Here, an AM RLC entity of the terminal may determine whether the RLC data unit is lost. As described above, operations for checking or acknowledging the loss of the RLC data unit is not performed in the TM and the UM.

When the AM RLC entity of the terminal detects the loss of the RLC data unit, the RLC status PDU needs to be configured to include information for transferring a result of the detection to the base station.

The terminal may configure the RLC status PDU indicating whether the RLC data unit is received (S320). Herein, the RLC status PDU includes at least one of a negative acknowledgement (NACK) sequence number field and a NACK range field.

For example, the AM RLC entity of the terminal needs to check the received RLC data unit and transmit information on loss of RLC data units due to various causes to the base station. To this end, the terminal configures the RLC status PDU (the RLC status report).

The RLC status PDU may include at least one of the NACK sequence number field and the NACK range field.

As an example, the NACK sequence number field includes information on a sequence number of the lost RLC SDU, which is detected by the AM RLC entity as being lost.

As another example, the NACK range field includes information on the number of detected consecutive lost RLC SDUs including the RLC SDU with the sequence number of the NACK sequence number field.

As still another example, the RLC status PDU may further include an indication field indicating whether the NACK range field for the sequence number indicated by the NACK sequence number field is included. For example, the indication field is used to notify about whether the NACK range field for indicating the number of consecutively lost RLC SDUs follows the NACK sequence number field. Considering existing field names, the indication field is hereinafter referred to as an E3 field as necessary.

For example, referring to FIG. 5, the indication field may be set as a value of 1 bit. When the indication field is set to zero, the indication field indicates that there is no NACK range field for a corresponding NACK sequence number. On the other hand, when the indication field is set to 1, the indication field indicates that there is a NACK range field for the corresponding NACK sequence number.

As yet another example, when the indication field is set to a value indicating that the NACK range field is included, the RLC status PDU may further include the SOend field including information indicating the last RLC SDU among the detected consecutive lost RLC SDUs including the RLC SDU with the sequence number of the NACK sequence number field. Here, the information indicating the last RLC SDU may indicate a byte position of the last RLC SDU indicated by the NACK range field including the RLC SDU with the sequence number of the NACK sequence number field.

As described above, the RLC status PDU may include at least one of the NACK sequence number field, the NACK range field, the indication field, and the SOend field. Also, the RLC status PDU may further include the E1, the E2, and the SOstart field that have been described above, as necessary.

According to the present disclosure unlike the typical technique, even when a plurality of RLC SDUs are lost, the RLC status PDU may include detected lost RLC SDU and a field for indicating the number of lost RLC SDU including a corresponding RLC SDU and thus may not indicate each RLC SDU but indicate the consecutive lost RLC SDU. Also, when there is no consecutive loss of the RLC SDUs, this may be indicated through the indication field (E3). Thus, it is possible to efficiently and dynamically configure the RLC status PDU.

The terminal may transmit the RLC status PDU to the base station (S330). By using the above method, the terminal may transmit the RLC status PDU to the base station.

Figure 4:
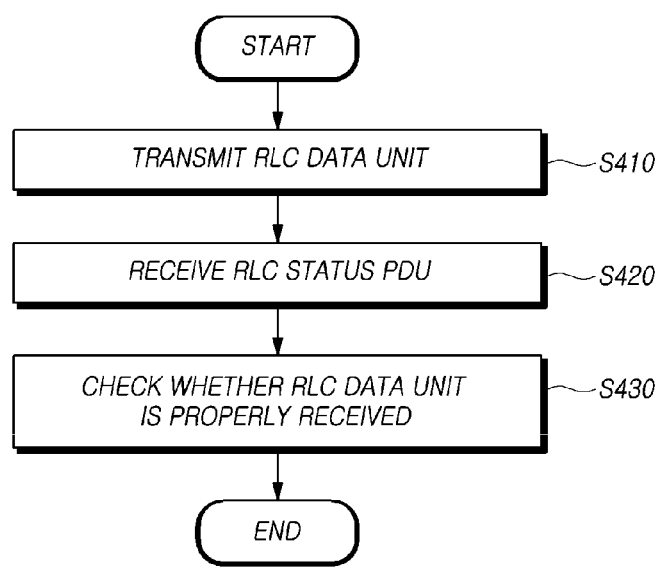
FIG. 4 is a flowchart illustrating operations of a base station according to an embodiment.

FIG. 4 is a flowchart illustrating operations of a base station operation according to an embodiment.

Referring to FIG. 4, the base station receives the RLC status PDU and transmits the RLC data unit to the terminal (S410). For example, the base station may transmit DL data to the terminal. The DL data may be transmitted through a physical layer, and a plurality of RLC data units may be segmented and concatenated in the MAC layer and then configured and transmitted as one transport block. That is, the base station may transmit DL data through a transport block including the DL RLC data unit.

Subsequently, through the above-described operation, the terminal may check whether the DL data (e.g., the RLC data unit) is lost and whether the DL data is received. This process may be performed by the AM RLC entity.

The base station may receive the RLC status PDU indicating whether the terminal receives the RLC data unit including at least one of the NACK sequence number field and the NACK range field (S420).

For example, the RLC status PDU may be configured by the AM RLC entity of the terminal that has received the RLC data unit. In order to transmit information regarding RLC data units lost due to various causes to the base station, the terminal configures the RLC status PDU (the RLC status report).

The RLC status PDU may include at least one of the NACK sequence number field and the NACK range field.

As an example, the NACK sequence number field includes information on the sequence number of the lost RLC SDU, which is detected by the AM RLC entity of the terminal as being lost.

As another example, the NACK range field includes information on the number of detected consecutive lost RLC SDUs including the RLC SDU with the sequence number of the NACK sequence number field.

As still another example, the RLC status PDU may further include the indication field indicating whether the NACK range field for the sequence number indicated by the NACK sequence number field is included. For example, the indication field is used to notify about whether the NACK range field for indicating the number of consecutively lost RLC SDUs follows the NACK sequence number field. For example, the indication field may be set as a value of 1 bit. When the indication field is set to zero, the indication field indicates that there is no NACK range field for the corresponding NACK sequence number. When the indication field is set to 1, the indication field indicates that there is a NACK range field for the corresponding NACK sequence number.

As yet another example, when the indication field is set to a value indicating that the NACK range field is included, the RLC status PDU may further include the SOend field including information indicating the last RLC SDU among the detected consecutive lost RLC SDUs including the RLC SDU with the sequence number of the NACK sequence number field. Here, the information indicating the last RLC SDU may indicate a byte position of the last RLC SDU indicated by the NACK range field including the RLC SDU with the sequence number of the NACK sequence number field.

As described, the RLC status PDU may include at least one of the NACK sequence number field, the NACK range field, the indication field, and the SOend field. Also, the RLC status PDU may further include the E1, the E2, and the SOstart field as necessary.

The base station may check whether the terminal has properly received the RLC data unit by using the RLC status PDU (S430). For example, the base station may check which of RLC data units (e.g., RLC SDUs), from among those that have been transmitted by the base station, has not properly transferred to the terminal by using a configuration and value of each field included in the RLC status PDU.

In detail, the base station may check which sequence number corresponds to a lost RLC SDU by using the sequence number value of the NACK sequence number field of the RLC status PDU. When the indication field is set to 1, the base station may check the NACK range field and may check how many RLC SDUs are consecutively lost.

Also, through the SOend field, the base station may check a byte position of information indicating the last RLC SDU among the detected consecutively lost RLC SDUs including the RLC SDU with the sequence number of the NACK sequence number field.

Thus, the base station may accurately check information on the lost RLC SDUs and also may perform reliable data transfer by transferring the lost RLC SDUs to the terminal again through a retransmission procedure or the like.

Accordingly, through the procedure, the terminal and the base station may perform a highly reliable data transmission and reception operation even without increasing overhead of the system.

Various embodiments including the above-described RLC status PDU configuring method will be described below. Each of the embodiments to be described below may be applied individually or collectively.

For a better understanding, the present disclosure will describe, as an example, a case in which DL data is transmitted. However, the same procedure may also be applied, by using the same fields, a case in which the terminal transmits the RLC data unit to the base station and the base station configures the RLC status PDU for the RLC data unit.

For convenience of description, in the following description and drawings, the ACK sequence number field may be referred to as ACK_SN or A_S, and the NACK sequence number field may be referred to as NACK_SN or N_S. Also, the segment offset start field may be referred to as SOstart or Ss, and the segment offset end field may be referred to as SOend or Se. Meanwhile, the above-described indication field may be referred to as ES in order to distinguish from the E1 and the E2 fields. The NACK range field may be referred to as NACK_SN_RANGE or N_R. However, the above description is for the sake of convenience, and the present invention is not limited thereto as long as the same information is included in each field.

Embodiment in which a Consecutive NACK_SN Range is Indicated

In the NR, the concatenation function is removed from the RLC layer and performed by the MAC layer to support fast terminal processing. Thus, an RLC PDU containing a relatively large number of RLC SNs may be processed compared to the LTE. Also, when the MAC PDU is lost during a transmission process, a large number of RLC PDUs are lost. For example, when one MAC PDU is lost, a plurality of RLC PDUs concatenated in the MAC PDU are lost.

In order to efficiently process the loss, the range/length/number of consecutive lost NACK_SNs may be contained in the RLC status PDU and then transmitted. The NACK range field, which is a field indicating the range/length/number of consecutive lost NACK_SNs, may be defined and included. As described above, the NACK range field is hereinafter referred to as NACK_SN_RANGE or N_R. This is merely for the sake of convenience of description, and the term may be replaced with other terms such as NACK_SN_LENGTH. As described with reference to FIG. 3 to FIG. 5, the NACK range field may be configured and indicated as a single field or may be configured and indicated as a plurality of fields.

The concatenation function is removed from the RLC layer and performed in the MAC layer. Thus, the RLC PDU may be segmented, included in different MAC PDUs, and then transmitted. Accordingly, when a specific MAC PDU is lost, the RLC SDU may often be partially lost. Accordingly, to accurately indicate the lost RLC data, there is a need to indicate a part lost by the segmentation on the basis of the RLC SDU. In the following description, the lost RLC data is represented based on an AMD PDU or an AMD PDU segment, but this is for the sake of convenience of description. When the segmentation is performed based on the AMD SDU because the concatenation function is removed from the RLC layer, the AMD SDU or an AMD SDU segment may be more appropriate than the AMD PDU or the AMD PDU segment. Also, by removing the concatenation function from the RLC layer, a plurality of RLC PDUs obtained by segmenting one RLC SDU has the same RLC SN. Accordingly, when the NACK_SN or the NACK range is described, the same SN is provided irrespective of being based on the RLC SDU or the RLC PDU. For convenience of description, the AMD PDU or the AMD PDU segment are used herein, but it is the same with the AMD SDU or the AMD SDU segment, which is covered within the scope of the present disclosure. In this specification, the AMD PDU denotes the PDU of the AM RLC. Likewise, the AMD SDU denotes the SDU of the AM RLC.

1) Embodiment for Configuring the NACK Range Field Through One Field

As an example, a field for indicating a consecutive NACK_SN range (i.e., the NACK range field) may indicate the number of consecutive lost AMD PDUs but not including the AMD PDU with SN=NACK_SN. In this case, as an example, NACK_SN indicating the SN of the lost AMD PDU (or a portion thereof, e.g., the AMD PDU segment)

detected by a receiver may represent the smallest NACK_SN of the consecutive lost AMD PDUs. As another example, NACK_SN indicating the SN of the lost AMD PDU (or a portion thereof) detected by a receiver may represent one plus the smallest NACK_SN of the consecutive lost AMD PDUs. As still another example, NACK_SN indicating the SN of the lost AMD PDU (or a portion thereof) detected by a receiver may represent the largest NACK_SN of the consecutive lost AMD PDUs. As yet another example, NACK_SN indicating the SN of the lost AMD PDU (or a portion thereof) detected by a receiver may represent the largest NACK_SN of the consecutive lost AMD PDUs minus one.

As yet another example, NACK_SN_RANGE may indicate the number of consecutive lost AMD PDUs including the AMD PDU with SN=NACK_SN. In this case, as an example, NACK_SN indicating the SN of the lost AMD PDU (or a portion thereof) detected by a receiver may represent the smallest NACK_SN of the consecutive lost AMD PDUs. As yet another example, NACK_SN indicating the SN of the lost AMD PDU (or a portion thereof) detected by a receiver may represent one plus the smallest NACK_SN of the consecutive lost AMD PDUs. As yet another example, NACK_SN indicating the SN of the lost AMD PDU (or a portion thereof) detected by a receiver may represent the largest NACK_SN of the consecutive lost AMD PDUs. As yet another example, NACK_SN indicating the SN of the lost AMD PDU (or a portion thereof) detected by a receiver may represent the largest NACK_SN of the consecutive lost AMD PDUs minus one.

When a field for indicating the above-described consecutive NACK_SN range is defined, the use of the field should be configurable. That is, a network or the terminal should be able to determine whether to use the NACK range field according to the amount of data transmission or wireless environments. As an example, the network may configure indication information for using a corresponding field in the terminal. When there is an indication from the network, the terminal may include a field for indicating whether to use the NACK range field (e.g., the indication field) in the RLC status PDU. As another example, the network or the terminal may autonomously include a field for indicating whether to use the NACK range field in the RLC status PDU.

2) Embodiment for Configuring the NACK Range Field Through Two Fields

As an example, when the field for indicating the consecutive NACK_SN range is represented by using two fields, a start SN field and an end SN field of NACK_SN_RANGE may be used. As an example, NACK_SN_RANGE_START_SN may indicate the smallest NACK_SN of the consecutive lost AMD PDUs, and NACK_SN_RANGE_END_SN may indicate the largest NACK_SN of the consecutive lost AMD PDUs. As another example, NACK_SN_RANGE_START_SN may indicate the largest NACK_SN of the consecutive lost AMD PDUs, and NACK_SN_RANGE_END_SN may indicate the smallest NACK_SN of the consecutive lost AMD PDUs. As still another example, NACK_SN_RANGE_START_SN may indicate the starting/first SN of the consecutive lost AMD PDUs, and NACK_SN_RANGE_END_SN may indicate the ending/last SN of the consecutive lost AMD PDUs.

When two fields for indicating the above-described consecutive NACK_SN range are defined, the use of the fields should be configurable. The network or the terminal should be able to determine whether to use the fields according to the amount of data transmission or wireless environments. As an example, the network may configure indication information for using a corresponding field in the terminal. When there is an indication from the network, the terminal may include a field for indicating whether to use two fields for indicating the NACK_SN range (e.g., the indication field) in the RLC status PDU. As another example, the network or the terminal may autonomously include a field for indicating whether to use two fields for indicating the NACK_SN range (e.g., a new extension field) in the RLC status PDU.

Various configuration embodiments of the range field for indicating consecutive NACK_SNs have been described above. However, since concatenation is performed in the MAC layer, there is a need to indicating a segmentation offset value in order to accurately check a lost RLC SDU. Various embodiments for indicating a segment offset will be described below.

Embodiment in which a Segmentation Offset is Indicated when a Consecutive NACK_SN Range is Indicated Through the NACK Range Field The concatenation function is removed from the RLC layer and performed in the MAC layer. Thus, the RLC PDU may be segmented, included in different MAC PDUs, and then transmitted. Accordingly, when a specific MAC PDU is lost, the RLC SDU may often be partially lost. Accordingly, in order to accurately indicate the lost RLC SDU, there is a need to accurately indicate a part lost by the segmentation. To this end, a field for indicating a segmentation offset is required.

In the following description, the lost part is referred to as the AMD PDU segment. However, this is for the sake of convenience of description. When the segmentation is performed based on the AMD SDU because the concatenation function is removed from the RLC layer, the AMD SDU segment may be more appropriate than the AMD PDU segment. For convenience of description, the AMD PDU segment is used herein, but it is the same with the AMD SDU segment, which is covered within the scope of the present disclosure.

1) Embodiment in which Two SOstart Fields and Two SOend Fields are Used when the NACK Range Field is Configured Through One Field When the NACK_SN range is indicated through one field, respective AMD PDU segments may occur in the starting one of the SNs of the consecutive lost AMD PDUs and the ending one of the SNs of the consecutive lost AMD PDUs.

FIG. 6 is a diagram showing the RLC status PDU format according to an embodiment.

Referring to FIG. 6, as an example, the segments may be indicated by using two SOstart field (segment offset start fields (Ss)) and two SOend fields (segment offset end fields (Se)). When an indictor (of, for example, 1 bit) indicating whether a field for indicating the NACK_SN range is consecutively included is E3, E3 may be set such that the field indicating the NACK_SN range follows. In this case, two SOstart fields and two SOend fields may be included.

For example, the first SOstart field may represent a portion of the AMD PDU (or the AMD SDU) with the starting NACK_SN among the consecutive lost AMD PDUs (or AMD SDUs). SOstart may indicate the position of the first byte of the portion of the AMD PDU (or the AMD SDU) in bytes within the data field of the AMD PDU (or the AMD SDU). The first SOend field may represent a portion of the AMD PDU (or the AMD SDU) with the starting NACK_SN among the consecutive lost AMD PDUs. SOend may indicate the position of the last byte of the portion of the AMD PDU (or the AMD SDU) in bytes within the data field of the AMD PDU (or the AMD SDU).

The second SOstart field may represent a portion of the AMD PDU (or the AMD SDU) with the ending NACK_SN among the consecutive lost AMD PDUs (or AMD SDUs). SOstart may indicate the position of the first byte of the portion of the AMD PDU (or the AMD SDU) in bytes within the data field of the AMD PDU (or the AMD SDU). The second SOend field may represent a portion of the AMD PDU (or the AMD SDU) with the ending NACK_SN among the consecutive lost AMD PDUs (or AMD SDUs). SOend may indicate the position of the last byte of the portion of the AMD PDU (or the AMD SDU) in bytes within the data field of the AMD PDU (or the AMD SDU).

On the contrary, the first SOstart field may represent a portion of the AMD PDU (or the AMD SDU) with the ending NACK_SN among the consecutive lost AMD PDUs (or AMD SDUs). SOstart may indicate the position of the first byte of the portion of the AMD PDU (or the AMD SDU) in bytes within the data field of the AMD PDU (or the AMD SDU). The first SOend field may represent a part of the AMD PDU (or the AMD SDU) with the ending NACK_SN among the consecutive lost AMD PDUs (or AMD SDUs). SOend may indicate the position of the last byte of the portion of the AMD PDU (or the AMD SDU) in bytes within the data field of the AMD PDU (or the AMD SDU).

The second SOstart field may represent a portion of the AMD PDU (or the AMD SDU) with the first/starting NACK_SN among the consecutive lost AMD PDUs (or AMD SDUs). SOstart may indicate the position of the first byte of the portion of the AMD PDU (or the AMD SDU) in bytes within the data field of the AMD PDU (or the AMD SDU). The second SOend field may represent a portion of the AMD PDU (or the AMD SDU) with the first/starting NACK_SN among the consecutive lost AMD PDUs (or AMD SDUs). SOend may indicate the position of the last byte of the portion of the AMD PDU (or the AMD SDU) in bytes within the data field of the AMD PDU (or the AMD SDU).

As described above, two SOstart fields or SOend fields may indicate byte positions of the starting NACK SN and the last NACK SN among the SNs of the consecutive lost AMD PDUs (or AMD SDUs).

2) Embodiment in which One SOstart Field and One SOend Field are Used when the NACK Range Field is Configured Through One Field When the NACK SN range is indicated through one field, respective AMD PDU segments (or AMD SDU segments) may occur in the starting/first NACK SN of the consecutive lost AMD PDUs (or AMD SDUs) and the ending/last NACK SN of the consecutive lost AMD PDUs (or AMD SDUs). In this case, the segments may be indicated by using one SOstart field and one SOend field.

FIG. 7 is an example diagram showing the RLC status PDU format according to another embodiment.

Referring to FIG. 7, since there are consecutive lost AMD PDUs, the starting/first NACK SN of the AMD PDUs (or AMD SDUs) may indicate only the SOstart field, and the ending/last NACK SN of the AMD PDUs (or AMD SDUs) may indicate only the SOend field. In this case, it is possible to distinguish the AMD PDU segment (or an AMD SDU segment) with the starting/first NACK SN of the consecutive lost AMD PDUs (or AMD SDUs) from the AMD PDU segment (or the AMD SDU segment) with the ending/last NACK SN of the consecutive lost AMD PDUs (or AMD SDUs).

When an indictor (of, for example, 1 bit) indicating whether a field for indicating the NACK_SN range follows E3, E3 may be set such that the field indicating the NACK_SN range follows. In this case, one SOstart field and one SOend field may be included.

As an example, the SOstart field may represent a portion of the AMD PDU (or the AMD SDU) with the starting NACK_SN among the consecutive lost AMD PDUs. SOstart may indicate the position of the first byte of the portion of the AMD PDU in bytes within the data field of the AMD PDU (or the AMD SDU). The SOend field may represent a portion of the AMD PDU (or the AMD SDU) with the ending NACK_SN among the consecutive lost AMD PDUs. SOend may indicate the position of the last byte of the portion of the AMD PDU (or the AMD SDU) in bytes within the data field of the AMD PDU (or the AMD SDU).

As another example, the SOstart field may represent a portion of the AMD PDU (or the AMD SDU) with the smallest NACK_SN among the consecutive lost AMD PDUs (or AMD SDUs). SOstart may indicate the position of the first byte of the portion of the AMD PDU (or the AMD SDU) in bytes within the data field of the AMD PDU (or the AMD SDU). The SOend field may represent a portion of the AMD PDU (or the AMD SDU) with the largest NACK_SN among the consecutive lost AMD PDUs (or AMD SDUs). SOend may indicate the position of the last byte of the portion of the AMD PDU (or the AMD SDU) in bytes within the data field of the AMD PDU (or the AMD SDU).

As described above, the NACK range includes information regarding the number of detected consecutively lost RLC SDUs including the RLC SDU with the sequence number of the NACK sequence number field. Accordingly, when the NACK range field is used, the last RLC SDU indicated by SOend has a sequence number equal to the sum of the NACK sequence number field and the NACK range minus one. For example, when RLC SDUs having SNs of 11, 12, and 13 are lost, NACK SN is 11. Also, the NACK range is 3. In this case, the sequence number of the last RLC SDU indicated by SOend is 13, which is equal to the sum of the NACK sequence number 11 and the NACK range 3 minus one.

FIGS. 6 and 7 assume that ACK_SN and NACK_SN are 18 bits in length. This is merely for convenience of description, and the use of a different number of bits is covered within the scope of the present disclosure. The number of bits in the NACK range field, the number of bits in the SOstart field, and the number of bits in the SOend field are covered in the scope of the present embodiment, irrespective of a specific number of bits.

However, the reason ACK_SN and NACK_SN are 18 bits in length is that the number of bits of the RLC SN being equal to the number of bits of the PDCP SN may facilitate processing between the terminal and the base station when the concatenation function is removed from the RLC layer.

Meanwhile, the E1 field in FIGS. 6 and 7 may be used as the indicator indicating whether NACK_SN+E1+E2+E3 follows.

3) Embodiment in which Two SOstart Fields and Two SOend Fields are Used when the NACK Range Field is Configured Through Two Fields.

When the field for indicating the consecutive NACK_SN range is represented by using two fields, a start SN field and an end SN field of NACK_SN_RANGE may be used. In this case, when an indictor (of, for example, 1 bit) indicating whether NACK_SN_RANGE_START_SN and NACK_SN_RANGE_END_SN follow is E3, E3 may be set such that NACK_SN_RANGE_START_SN and NACK_SN_RANGE_END_SN follow. In this case, an SOstart field and an SOend field for NACK_SN_RANG- E_START_SN and an SOstart field and an SOend field for NACK_SN_RANGE_END_SN may be included.

When the above-described NACK SN range is indicated through one field, the SOstart field and the SOend field may be configured to have the same information as that of embodiment 1 in which two SOstart fields and two SOend fields are used.

4) Embodiment in which One SOstart Field and One SOend Field are Used when the NACK Range Field is Configured Through Two Fields When the field for indicating the consecutive NACK_SN range is represented by using two fields, a start SN field and an end SN field of NACK_SN_RANGE may be used. In this case, when an indictor (of, for example, 1 bit) indicating whether NACK_SN_RANGE_START_SN and NACK_SN_RANGE_END_SN follow is E3, E3 may be set such that NACK_SN_RANGE_START_SN and NACK_SN_RANGE_END_SN follow. In this case, SOstart may indicate an SOstart value for NACK_SN_RANGE_START_SN. The SOend field may indicate an SOend value for NACK_SN_RANGE_END_SN.

When the above-described NACK SN range is indicated through one field, the SOstart field and the SOend field may be configured to have the same information as that of embodiment 2 in which one SOstart field and one SOend field are used.

The generation of the RLC status PDU will be described below.

The AM RLC entity transmits a status PDU in order to provide positive and/or negative checking for RLC PDUs (or portions thereof) to the peer AM RLC entity.

A trigger to initiate status reporting includes polling oriented from the peer AM RLC entity and detection of reception failure of an RLC data PDU. In detail, the trigger is determined according to whether the following status reporting trigger conditions are satisfied.

Triggers to initiate STATUS reporting include:
Polling from the peer AM RLC entity:
When the RLC data PDU with SN=x and the P field set to "1" is received from lower layer, the receiving side of an AM RLC entity shall:
When the PDU is to be discarded as specified in subclause 5.1.3.2.2; or
When x<VR(MS) or x>=VR(MR):
trigger a STATUS report;
else:
delay triggering the STATUS report until x<VR(MS) or x>=VR(MR).
Detection of reception failure of the RLC data PDU, except for an NB-IoT UE not configured with enableStatusReportSN-Gap:
The receiving side of an AM RLC entity shall trigger a STATUS report when t-Reordering expires.

When the status PDU is transferred to a lower layer, a receiving AM RLC entity starts t-statusProhibit timer, and generates and transfers a single status PDU to the lower layer when the timer expires.

When the status PDU is constructed, the AM RLC entity sets the NACK SN of the AMD PDU that has yet to receive byte segments as the SN of the AMD PDU. The NACK SN, SOstart, SOend of a consecutive sequence of byte segment of the AMD PDU that have not yet been received or that is partially received are included.

(When constructing a STATUS PDU, the AM RLC entity shall:
The receiving side of the AM RLC entity shall trigger a STATUS report when t-Reordering expires
for the AMD PDU for which byte segments have yet to be received:
include in the STATUS PDU a NACK_SN which is set to the SN of the AMD PDU;
for a continuous sequence of byte segments of a partly received AMD PDU that have yet to be received:
include in the STATUS PDU a set of NACK_SN, SOstart and SOend
set the ACK_SN to the SN of the following unreceived RLC Data PDU which is not indicated as missing in the resulting STATUS PDU).

As described above, the AMD PDU may refer to the RLC SDU.

As described above, by indicating the range or number of consecutive lost NACK SNs through one or two fields and defining one or two SOstart and SOend fields, it is possible to accurately transfer information regarding lost RLC SDU without increasing system overhead even when a plurality of RLC SDU are lost.

The configurations of the terminal and the base station that may implement various embodiments described with reference to FIGS. 1 to 7 individually or collectively will be described below with reference to the following drawings.

Figure 8:
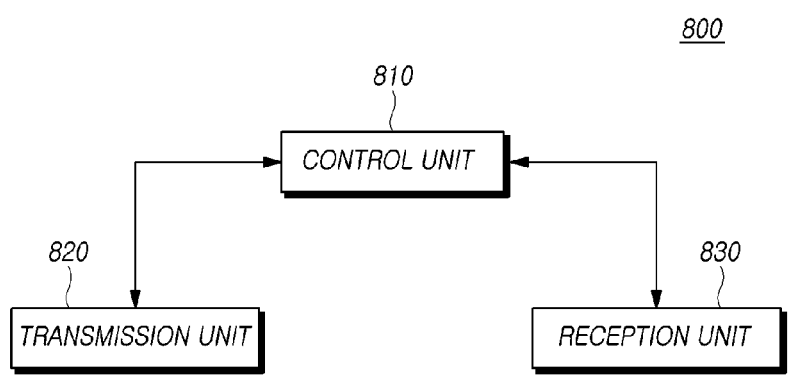
FIG. 8 is a diagram illustrating a terminal according to an embodiment.

FIG. 8 is a diagram illustrating a terminal according to an embodiment.

Referring to FIG. 8, the terminal 800 that transmits the RLC status PDU may include a reception unit 830 that receives the RLC data unit from the base station, a control unit 810 that configures the RLC status PDU indicating whether the RLC data unit, which includes at least one of the NACK sequence number field and the NACK range field, is received, and a transmission unit 820 that transmits the RLC status PDU to the base station.

For example, the reception unit 830 may receive DL data from the base station. The DL data may be received through a physical layer, and a plurality of RLC data units may be segmented and concatenated in the MAC layer and then received as one transport block.

The control unit 810 checks whether the RLC data unit is lost. Here, whether the RLC data unit is lost may be performed by an Acknowledged Mode (AM) RLC entity of the terminal.

The control unit 810 configures the RLC status PDU (the RLC status report).

The RLC status PDU may include at least one of the NACK sequence number field and the NACK range field.

As an example, the NACK sequence number field includes information on the sequence number of the RLC SDU detected by the AM RLC entity as being lost.

As another example, the NACK range field includes information on the number of detected consecutive lost RLC SDUs including the RLC SDU with the sequence number of the NACK sequence number field.

As still another example, the RLC status PDU may further include the indication field indicating whether the NACK range field for the sequence number indicated by the NACK sequence number field is included. For example, the indication field is used to notify about whether the NACK range field for indicating the number of consecutive lost RLC SDUs follows the NACK sequence number field.

As yet another example, when the indication field is set to a value indicating that the NACK range field is included, the RLC status PDU may further include the SOend field including information indicating the last RLC SDU among the detected consecutive lost RLC SDUs including the RLC SDU with the sequence number of the NACK sequence number field. Here, the information indicating the last RLC SDU may indicate a byte position of the last RLC SDU indicated by the NACK range field including the RLC SDU with the sequence number of the NACK sequence number field.

As described above, the RLC status PDU may include at least one of the NACK sequence number field, the NACK range field, the indication field, and the SOend field. Also, the RLC status PDU may further include the E1, the E2, and the SOstart field that have been described above, as necessary.

In addition, the reception unit 830 receives DL control information, data, and messages from the base station through the corresponding channel, and the transmission unit 820 transmits UL control information, data, and messages to the base station through the corresponding channel.

Also, the control unit 810 configures the RLC status PDU including the NACK range field needed to implement the above-described embodiments and controls the entire operation of the terminal 800 when a plurality of RLC SDUs accurately transmit lost details to the base station.

Figure 9:
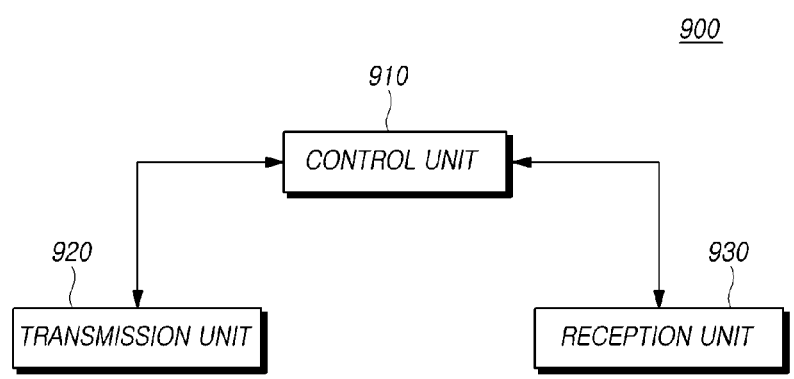
FIG. 9 is a diagram showing a base station according to an embodiment.

FIG. 9 is a diagram showing a base station according to an embodiment.

Referring to FIG. 9, the base station 900 that receives the RLC status PDU may include a transmission unit 920 that transmits the RLC data unit to the terminal, a reception unit 930 that receives the RLC status PDU indicating whether the terminal has received the RLC data unit including at least one of the NACK sequence number field and the NACK range field, and a control unit 910 that checks whether the terminal has properly received the RLC data unit by using the RLC status PDU.

The transmission unit 920 may transmit DL data to the terminal. The DL data may be transmitted through a physical layer, and a plurality of RLC data units may be segmented and concatenated in the MAC layer and then configured and transmitted as one transport block.

The reception unit 930 receives the RLC status PDU including information on a result of the AM RLC entity of the terminal checking whether the RLC data unit transmitted to the terminal is lost.

The RLC status PDU may include at least one of the NACK sequence number field and the NACK range field.

As an example, the NACK sequence number field includes information on the sequence number of the RLC SDU detected by the AM RLC entity of the terminal as being lost.

As another example, the NACK range field includes on regarding the number of detected consecutive lost RLC SDUs including the RLC SDU with the sequence number of the NACK sequence number field.

As still another example, the RLC status PDU may further include the indication field indicating whether the NACK range field for the sequence number indicated by the NACK sequence number field is included. For example, the indication field is used to notify about whether the NACK range field for indicating the number of consecutive lost RLC SDUs follows the NACK sequence number field.

As yet another example, when the indication field is set to a value indicating that the NACK range field is included, the RLC status PDU may further include the SOend field including information indicating the last RLC SDU among the detected consecutive lost RLC SDUs including the RLC SDU with the sequence number of the NACK sequence number field. Here, the information indicating the last RLC SDU may indicate a byte position of the last RLC SDU indicated by the NACK range field including the RLC SDU with the sequence number of the NACK sequence number field.

As described above, the RLC status PDU may include at least one of the NACK sequence number field, the NACK range field, the indication field, and the SOend field. Also, the RLC status PDU may further include the E1, the E2, and the SOstart field that have been described above, as necessary.

The control unit 910 may check which of RLC data units (e.g., RLC SDUs), from among those that have been transmitted by the base station, has not properly transferred to the terminal by using a configuration and value of each field included in the RLC status PDU.

In detail, the control unit 910 may check which sequence number corresponds to a lost RLC SDU by using the sequence number value of the NACK sequence number field of the RLC status PDU. When the indication field is set to 1, the control unit 910 may check the NACK range field and may check how many RLC SDUs are consecutively lost. Also, through the SOend field, the control unit 910 may check a byte position of information indicating the last RLC SDU among the detected consecutive lost RLC SDUs including the RLC SDU with the sequence number of the NACK sequence number field. Thus, the base station 900 may accurately check information regarding the lost RLC SDUs and also may perform reliable data transfer by transferring the lost RLC SDUs to the terminal again through a retransmission procedure or the like.

In addition, the control unit 910 configures the RLC status PDU including the NACK range field needed to implement the above-described embodiments and controls the entire operation of the base station 900 when a plurality of RLC SDUs accurately receive lost details from the terminal.

Also, the transmission unit 920 and the reception unit 930 are used to transmit or receive the signal, a message or data needed to implement the above-described embodiments to the terminal.

According to exemplary embodiments, it is possible to configure an efficient RLC status PDU capable of transmitting and receiving information regarding the RLC data unit lost in the RLC layer without minimizing system overhead.

Also, according to exemplary embodiments, it is possible to provide a detailed method for guaranteeing high reliability for data even in the network in which a connection function is configured in the MAC layer.

Specifications and standards mentioned in the foregoing embodiments are omitted herein to simplify the description of the specification and constitute part of the present specification. Therefore, it should be understood that part of the specifications and standards can be added to the present specification or be specified in the claims within the scope of the present invention.

The above description is only illustrative of the technical idea of the present invention, and those skilled in the art will appreciate that various modifications, additions and substitutions are possible, without departing from the essential characteristics of the invention. Therefore, the embodiments disclosed herein are intended not to limit but to describe the technical spirit of the present invention, and the scope of the present invention is not limited to the embodiments. The scope of the invention should be construed by the appended claims, and all technical sprits within the scope of their equivalents should be construed as included in the scope of the invention.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of a terminal for transmitting a radio link control (RLC) status protocol data unit (PDU), the method comprising:
   receiving an RLC data unit from a base station;
   configuring an RLC status PDU indicating whether the RLC data unit is received, where the RLC status PDU includes a negative acknowledgement (NACK) sequence number field and a NACK range field; and
   transmitting the RLC status PDU to the base station,
   wherein the NACK sequence number field includes information on a sequence number of an RLC service data unit (SDU) detected by loss of an acknowledged mode (AM) RLC entity, and
   wherein the NACK range field includes information on a number of detected consecutive lost RLC SDUs including an RLC SDU with the sequence number of the NACK sequence number field,
   wherein the RLC status PDU includes an indication field for indicating whether the NACK range field for the sequence number of the NACK sequence number field is included, and
   wherein when the indication field is set to indicate that the NACK range field is included, the RLC status PDU further includes a segment offset end (SOend) field including information indicating a last RLC SDU among the detected consecutive lost RLC SDUs including the RLC SDU with the sequence number of the NACK sequence number field.

2. The method of claim 1, wherein the information indicating the last RLC SDU indicates a byte position of the last RLC SDU indicated by the NACK range field including the RLC SDU with the sequence number of the NACK sequence number field.

3. A method of a base station for receiving a radio link control (RLC) status protocol data unit (PDU), the method comprising:
   transmitting an RLC data unit to a terminal;
   receiving an RLC status PDU indicating whether the terminal has received the RLC data unit wherein the RLC status PDU includes a negative acknowledgement (NACK) sequence number field and a NACK range field; and
   checking whether the terminal has properly received the RLC data unit by using the RLC status PDU,
   wherein the NACK sequence number field includes information on a sequence number of an RLC service data unit (SDU) detected by loss of an acknowledged mode (AM) RLC entity of the terminal,
   wherein the NACK range field includes information on a number of detected consecutive lost RLC SDUs including an RLC SDU with the sequence number of the NACK sequence number field,
   wherein the RLC status PDU includes an indication field for indicating whether the NACK range field for the sequence number of the NACK sequence number field is included, and
   wherein when the indication field is set to indicate that the NACK range field is included, the RLC status PDU further includes a segment offset end (SOend) field including information indicating a last RLC SDU among the detected consecutive lost RLC SDUs including the RLC SDU with the sequence number of the NACK sequence number field.

4. The method of claim 3, wherein the information indicating the last RLC SDU indicates a byte position of the last RLC SDU indicated by the NACK range field including the RLC SDU with the sequence number of the NACK sequence number field.

5. A terminal for transmitting a radio link control (RLC) status protocol data unit (PDU), the terminal comprising:
   a receiver configured to receive an RLC data unit from a base station;
   a controller configured to configure an RLC status PDU indicating whether the RLC data unit is received, where the RLC status PDU includes a negative acknowledgement (NACK) sequence number field and a NACK range field; and
   a transmitter configured to transmit the RLC status PDU to the base station,
   wherein the NACK sequence number field includes information on a sequence number of an RLC service data unit (SDU) detected by loss of an acknowledged mode (AM) RLC entity, and
   wherein the NACK range field includes information on a number of detected consecutive lost RLC SDUs including an RCL SDU with the sequence number of the NACK sequence number field,
   wherein the RLC status PDU includes an indication field for indicating whether the NACK range field for the sequence number of the NACK sequence number field is included, and
   wherein when the indication field is set to indicate that the NACK range field is included, the RLC status PDU further includes a segment offset end (SOend) field including information indicating the a RLC SDU among the detected consecutive lost RLC SDUs including the RLC SDU with the sequence number of the NACK sequence number field.

6. The terminal of claim 5, wherein the information indicating the last RLC SDU indicates a byte position of the last RLC SDU indicated by the NACK range field including the RLC SDU with the sequence number of the NACK sequence number field.

* * * * *